3,446,799
NOVEL PYRIDO[2,3-b][1,5]BENZOOXAZEPIN-5-ONES AND PYRIDO[2,3-b][1,5]BENZOTHI-AZEPIN-5-ONES

Charles Hoffmann, Enghien-les-Bains, and Andrée Faure, Paris, France, assignors to Societe Anonyme dite: Laboratoires U.P.S.A., Gennevilliers, France, a company of France
No Drawing. Filed Apr. 5, 1966, Ser. No. 540,176
Claims priority, application Great Britain, Apr. 7, 1965, 14,811/65
Int. Cl. C07d 11/06; A61k 27/00
U.S. Cl. 260—239.3     11 Claims

ABSTRACT OF THE DISCLOSURE

Compounds of the formula

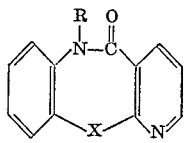

I in which X is oxygen or sulphur and R is hydrogen or a radical of the formula

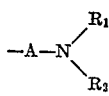

in which A is an alkylene chain of between 2 and 6 carbon atoms and $R_1$ and $R_2$ are alkyl groups of 1 to 4 carbon atoms and $R_1$ and $R_2$ may form a heterocyclic ring together with the adjacent nitrogen atom, have valuable antispasmodic and antihistaminic activity. The compounds are prepared by condensation of a 2-halonicotinoyl halide with o-aminophenol or o-aminothiophenol in one or two stages.

---

This invention relates to heterocyclic compounds, processes for their preparation, and pharmaceutical compositions containing them.

The present invention provides, as new compounds, the heterocyclic derivatives of the formula:

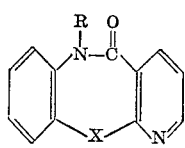

I in which X represents oxygen or sulphur and R represents hydrogen or a radical of the formula

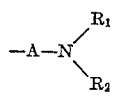

in which A repersents a straight or branched alkylene chain of 2 to 6 carbon atoms and $R_1$ and $R_2$ are the same or different alkyl groups, preferably of 1–4 carbon atoms each, or together with adjacent nitrogen represent a saturated, mononuclear, 5 to 7-membered ring such as pyrrolidino, piperidino, morpholino, piperazino, or 4-alkylpiperazino, as well as the acid addition salts of those compounds in which X is the radical

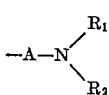

Preferred compounds of Formula I are those in which the alkylene chain A is an ethylene or isopropylene radical and $R_1$ and $R_2$ are both methyl or both ethyl or together with the adjacent nitrogen represent a morpholino radical.

The compounds of Formula I in which R represents

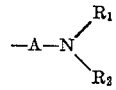

have interesting pharmaceutical properties, and in particular, are active as anti-spasmodics and anti-histaminics. The compounds of Formula I in which R is hydrogen, are intermediates useful in the preparation of the aforesaid pharmaceutically active compounds.

According to a feature of the invention the compounds of Formula I in which R is hydrogen, are prepared by reaction of a 2-halonicotinoyl halide with o-aminophenol or o-aminothiophenol. The reaction may be carried out in one or two stages. In the one-stage reaction, it is preferred to heat the reactants in an inert solvene in the presence of a basic condensation agent, such as pyridine. In the two-stage reaction, the reactants are first heated in an inert solvent while the amino group reacts with the acyl halide group, and the reaction product is subsequently heated in the presence of a basic condensation agent, such as sodium methoxide, to produce the compound of Formula I.

According to a further feature of the invention, the compounds of Formula I in which R represents

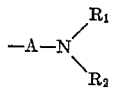

are prepared by reaction of the compound of Formula I in which R represents hydrogen with a halide of the formula: Hal

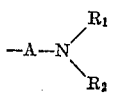

where Hal represents halogen, in the presence of a basic condensation agent, such as an alkali metal amide, an alkali metal or an alkali metal alkoxide. The reaction is preferably carried out by heating the reactants in an inert solvent.

The following examples illustrate the invention:

EXAMPLE 1

A mixture of 2-chloronicotinoyl chloride (24.5 g.), o-aminothiophenol (17.5 g.), anhydrous benzene (350 cc.), and pyridine (23 g.) is heated under reflux for three hours. After cooling, the crystalline product is filtered off and washed with water until free from chlorides. It is then washed with alcohol and dried at 100° C. After re-crystallization from dioxane, pyrido [2,3-b] [1,5]benzothiaxepin-5-one (13 g.) is obtained, M.P. 260° C. (Kofler block) with sublimation. The analysis of the product is as follows (in percent): Calculated for $C_{12}H_8N_2OS$, C, 63.13; H, 3.53; N, 12.27; S, 14.01. Found: C, 63.07; H, 3.55; N, 12.29; S, 14.58.

EXAMPLE 2

A mixture of 2-chloronicotinoyl chloride (18 g.), o-aminophenol (22 g.), and tetrahydrofuran (150 ccm.) is heated under reflux for two hours. The o-aminophenol hydrochloride formed is filtered off and the filtrate is diluted with water (1 liter). The precipitate formed is filtered off, and washed with 50% aqueous alcohol. o-(2-chloronicotinoylamino)phenol (24 g.) is obtained, M.P. 158° C. Re-crystallization from a mixture of water and alcohol (75:25) raises the melting point to 160° C. The product analyses as follows (in percent): Calculated for $C_{12}H_9ClN_2O$, Cl, 14.25; N, 11.26. Found: Cl, 14.32; N, 10.85.

This compound is cyclised to the oxazepine by treatment with the theoretical quantity of sodium methoxide in absolute alcohol, removing the sodium salt precipitated, and heating it for four hours under reflux in dimethylformamide at 160–165° C. The dimethylformamide is then distilled off in vacuo to reduce the mixture to small bulk, and the latter is then allowed to crystallize for 10 hours. Pyrido [2,3-b] [1,5]benzooxazepin-5-one is obtained, M.P. 260° C., and is then recrystallized from dioxane. The re-crystallized product analyses as follows: Calculated for $C_{12}H_8N_2O_2$, C, 67.81; H, 3.80; N, 13.20. Found, C, 67.79; H, 3.73; N, 13.00.

EXAMPLE 3

The product of Example 1 (9 g.) is refluxed for one hour with sodamide (2 g.) in anhydrous dioxane (60 cc.). The mixture is allowed to cool and β-diethylaminoethyl chloride (6 g.) is added and the mixture is refluxed for 16 hours. The sodium chloride formed is removed by filtration and the dioxane distilled off in vacuo. The coloured viscous residue is taken up in luke-warm normal hydrochloric acid (40 cc.), the solution is filtered, and then evaporated to dryness. Dehydration of the residue with absolute alcohol gives the hydrochloride of 6-(β-diethylaminoethyl)-pyrido[2,3-b] [1,5]benzothiazepin-5-one, M.P. 170° C. Its analysis is as follows (in percent): Calculated for $C_{18}H_{21}N_3OS.HCl.\frac{1}{2}H_2O$, C, 57.97; H, 6.21; N, 11.29; S, 8.59; Cl, 9.50. Found: C, 58.12; H, 6.20; N, 10.81; S, 8.65; Cl, 9.47. This hydrochloride is very soluble in water.

EXAMPLE 4

Proceeding as in Example 3, but replacing β-diethylaminoethyl chloride by the equivalent quantity of β-dimethylaminoethyl chloride, and working up as described, 6-(β-dimethylaminoethyl)-pyrido [2,3-b] [1,5] benzothiazepin-5-one hydrochloride is obtained. The base may be separated by neutralization of the hydrochloride with sodium hydroxide solution and re-crystallization from a mixture of diisopropyl ether and isopropanol (50:50). It melts at 110° C. (Kofler block), and its analysis is as follows (in percent): Calculated for $C_{16}H_{18}N_3OS$, C, 63.97; H, 6.03; N, 13.98. Found: C, 63.97; H, 5.71; N, 14.20.

The hydrochloride may be obtained from this base by dissolving it in the theoretical quantity of N-hydrochloric acid, evaporating the solution to dryness, and re-crystallizing the residue from methanol. It is very soluble in water and decomposes on melting. Its analysis is as follows (in percent): Calculated for $C_{16}H_{18}N_3OS.HCl$, C, 57.04; H, 5.68; N, 12.47; S, 9.52; Cl, 10.52. Found: C, 57.16; H, 5.36; N, 12.97; S, 9.45; Cl, 10.31.

EXAMPLE 5

Proceeding as in Example 3, but replacing β-diethylaminoethyl chloride by β-morpholinoethyl chloride, and isolating the base as in Example 4, 6-(β-morpholinoethyl)-pyrido[2,3-b] [1,5] benzothiazepin-5-one is obtained, M.P. 102° C. (Kofler block). Its analysis is as follows (in percent): Calculated for $C_{18}H_{19}N_3O_2S$, C, 63.31; H, 5.60; N, 12.31; S, 9.38. Found: C, 63.30; H, 5.52; N, 12.28; S, 9.51. Its hydrochloride may be prepared as in Example 4 and re-crystallized from isopropanol or absolute alcohol. It melts at 224–228° C. with sublimation and decomposition.

EXAMPLE 6

The product of Example 2 (10.5 g.), sodamide (2 g.), and anhydrous dioxane (150 cc.) are heated together under reflux for one hour. After cooling, β-diethylaminoethyl chloride (7.35 g.) is added, and the mixture is heated under reflux for 16 hours. The sodium chloride formed is filtered off, the dioxane is distilled off in vacuo, and the viscous residue is taken up in N-hydrochloric acid (50 cc.). The hydrochloric acid solution is filtered through animal charcoal and then neutralized with N-sodium hydroxide solution. The oil obtained is extracted with ether and the ethereal extract is dried over anhydrous potassium carbonate and evaporated. The resulting oil (12.5 g.) is taken up in N-hydrochloric acid (40 cc.), and the solution is evaporated to dryness and dehydrated with absolute alcohol, and the residue finally taken up in ether. White crystals of 6-(β-diethylaminoethyl)-pyrido [2,3-b] benzooxazepin-5-one hydrochloride are obtained, M.P. 175° C. after re-crystallization from isopropanol. Its analysis is as follows (in percent): Calculated for $C_{18}H_{21}N_3O_2HCl$, C, 62.15; H, 6.42; N, 12.08; Cl, 10.19. Found: C, 62.15; H, 6.32; N, 12.10; Cl, 10.11.

EXAMPLE 7

Proceeding as in Example 6, but replacing β-diethylaminoethyl chloride by β-dimethylaminoethyl chloride, 6-(β-dimethylaminoethyl)pyrido [2,3-b] benzooxazepin-5-one hydrochloride is obtained, M.P. 213–214° C. (Kofler block) after re-crystallization from absolute alcohol. Its analysis is as follows: Calculated for $C_{16}H_{17}N_3O.HCl$, C, 60.09; H, 5.34; N, 13.14; Cl, 11.08. Found: C, 59.90; H, 5.54; N, 13.20; Cl, 11.03.

EXAMPLE 8

Proceeding as in Example 6, but replacing β-diethylaminoethyl chloride by β-morpholinoethyl chloride, and working up the mixture in similar fashion, a crude base is obtained, M.P. 104° C. This crude base (12 g.) is dissolved in N-hydrochloric acid (36 cc.), and the solution is filtered and evaporated in vacuo. Dehydration of the residue with absolute alcohol gives a solid hydrochloride which is re-crystallized from isopropanol. 6-(β-morpholinoethyl)pyrido [2,3-b] [1,5]-benzooxazepin-5-one hydrochloride is thus obtained, M.P. about 200° C. (dec.). Its analysis is as follows in percent: Calculated for $C_{18}H_{19}N_3O_3.HCl$, C, 59.74; H, 5.57; N, 11.61; Cl, 9.79. Found: C, 59.90; H, 5.76; N, 11.34; Cl, 9.81.

The base may be obtained from the hydrochloride in the manner described in Example 4 and then melts at 110–111° C. (Kofler block). Its analysis is as follows in percent: Calculated for $C_{18}H_{19}N_3O_3$, C, 66.44; H, 5.88; N, 12.91. Found: C, 66.41; H, 5.97; N, 12.97.

EXAMPLE 9

Potassium t-butylate is prepared from 2 g. potassium and 30 ml. t-butanol. 10 g. of the product obtained according to Example 2 are added and the mixture is heated for 1 hour under reflux and stirring. After cooling down to ambient temperature, 6 g. of β-dimethylamino-propyl chloride are added and the mixture is heated under reflux for 14 hours. After cooling the potassium chloride is removed by filtration and the solvent is evaporated in vacuo. The residue is dissolved in 5% acetic acid and filtered. The base is separated by means of concentrated ammonia. It crystallizes in the reaction medium after seeding. Filtration and washing with water. The base, 6-(β-dimethylaminopropyl) pyrido [2,3-b] [1,5] benzooxanepin-5-one, is recrystallized from isopropyl ether. It melts at 122° C. Its analysis is as follows in percent: Calculated for $C_{17}H_{19}N_3O_2$, N, 14.13. Found: N, 14.06.

The base is converted into hydrochloride in the usual manner. The latter is recrystallized from isopropanol in the form of white crystals, melting at 235° C., and very soluble in water. Its analysis is as follows in percent: Calculated for $C_{17}H_{19}N_3O_2$, ClH; Cl, 10.62; N, 12.58. Found: Cl, 10.47; N, 12.56.

EXAMPLE 10

Potassium t-butylate is prepared from 3.3 g. potassium and 30 ml. t-butanol. After cooling 20 g. of the product obtained according to Example 1 are added. Heating for 1 hour under reflux and stirring. After cooling 9.6 g. of 3-dimethylaminopropyl chloride are added and the mixture is subsequently heated for 14 hours under reflux.

The mixture is cooled, KCl is separated by filtration and the solvent is evaporated. The residue is taken up in 5% acetic acid in an amount sufficient to reach a pH of 4.0. Filtration is effected in order to eliminate the small amount of insoluble material. The acetic solution is treated with concentrated ammonia with a view of separating the base. The latter is extracted by means of ethyl ether and then dried on potassium carbonate. After evaporation of the ether, a yellow solid is obtained which is recrystallized from isopropyl ether. 15 g. of 6-($\beta$-dimethylaminopropyl) pyrido-[2,3-b] [1,5] benzothiazepin-5-one are obtained, melting at 114° C. (Kofler block). The product analyzes as follows in percent: Calculated for $C_{17}H_{19}N_3OS$, S, 10.23; N, 13.40. Found: S, 10.46; N, 13.42.

The base is converted into hydrochloride according to the method used in the preceding examples. Hydrochloride is recrystallized from absolute alcohol in the form of white crystals, melting at 244° C. (decomposition), and very soluble in water. The product analysis as follows in percent: Calculated for $C_{17}H_{19}N_3OS$, ClH; Cl, 10.13; N, 12.01. Found: Cl, 10.07; N, 11.95.

The compounds according to the invention are particularly useful as antihistaminic, anticholinergic and anti-spasmodic agents. Their activities are shown in the following pharmacological tests.

By a test, intended to protect guinea-pigs against experimental asthma, caused by inhalation of a histamine aerosol (0.5% aqueous solution), it was established that the compounds of Examples 9 and 10 are liable to efficaciously protect the guinea-pig from death from histamine aerosols.

The effective amounts of the compound of Example 9 in said test is about 5 mg./kg.; the effective amount of the compound of Example 10 is slightly higher, i.e. of the order of 7 mg./kg.

Comparatively, the active amount of promethazine is of the order of 0.5 mg./kg.

However, the compounds according to the invention show an interesting property, which is not present in promethazine.

Tests made on the isolated duodenum of the rat show, that the compounds such as described in Examples 9 and 10 act against spasms caused by acetylcholine and barium chloride.

Moreover said compounds are active as anti-cholinergic agents (the effective rate of concentration on the isolated duodenum is approximately $0.2 \times 10^{-3}$).

Finally, said compounds cause a decrease in blood pressure in dogs.

When administered to rabbits by intravenous injections, the compound of Example 9 (20–30 mg./kg.) and the compound of Example 10 (10 mg./kg.) cause rapidly reversible excitation phenomena.

When administered to rats by means of peritoneal injections, excitation phenomena are created by the compound of Example 9 (200 mg/kg) and the compound of Example 10 (100 mg./kg), which even resemble epileptiform fits.

Furthermore, the said compounds have many interesting therapeutic properties. More particularly, the compounds of Examples 9 and 10 are effective as anti-histaminic and anti-spasmodic agents in various indications for which this kind of medicines is used, namely: Pathology of the breathing apparatus.

The said compounds are effective in the treatment of allergic asthmas and asthmatiform dyspneas, hay fever, spasmodic corxzas, whooping cough and similar coughs.

The action of the said products becomes rapidly apparent and consists in a substantial decrease in the intensity of the dyspnea in asthmatic subjects, in a decrease of the frequency and intensity of the fits of coughing in subjects suffering from whooping cough and ordinary coughs, accompanied by the feeling of psychic relaxation. Dermatology.

The compounds of Examples 9 and 10 showed excellent results in diseases of allergic origin, particularly dermatites, eczemas, urticaria, Quincke's edema and prurigo. An obvious attenuation of the pruriginous and cutaneous symptoms is observed.

No detrimental side effects were noticed in patients subjected to clinical tests. It is of interest to note that in most of the cases the sedative effect of a medicine which is both anti-histaminic and anti-spasmodic was not prolonged by a hypnotic effect.

The compounds of Examples 9 and 10 are thus characterized by a double activity and a good tolerance. They may be given in dosages ranging from 25 mg.–100 mg.

The invention includes within its scope pharmaceutical compositions comprising one or more of the compounds of Formula I in which R is the radical

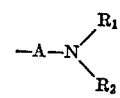

in associationd with a significant amount of a pharmaceutical carrier compatible therewith. Such compositions may be made up in a form suitable for oral, parenteral or rectal administration, and the diluents used may be those conventionally used for such compositions.

What we claim is:

1. A compound of formula

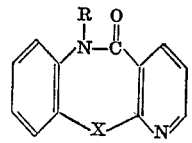 I in which X represents oxygen or sulphur and R represents hydrogen or a radical of the formula

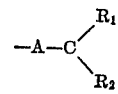

in which A represents a straight or branched alkylene chain of 2 to 6 carbon atoms and $R_1$ and $R_2$, taken separately, are identical or different, each representing an alkyl group of 1–4 carbon atoms, or $R_1$ and $R_2$ together form a morpholine ring with the adjacent nitrogen, and the pharmaceutically acceptable acid addition salts thereof.

2. The compound 6-($\beta$-dimethylaminopropyl)-pyrido-[2,3-b][1,5]benzooxazepin-5-one and its hydrochloride.

3. The compound 6-($\beta$-dimethylaminopropyl)pyrido-[2,3-b][1,5]benzothiazepin-5-one and its hydrochloride.

4. The compound according to claim 1 which is pyrido [2,3-b][1,5]benzothiazepin-5-one.

5. The compound according to claim 1 which is pyrido [2,3-b][1,5]benzooxazepin-5-one.

6. The compound according to claim 1 which is 6-($\beta$-diethylaminoethyl) - pyrido[2,3-b][1,5]benzothiazepin-5-one.

7. The compound according to claim 1 which is 6-($\beta$-dimethylaminoethyl) - pyrido[2,3-b][1,5]benzothiazepin-5-one hydrochloride.

8. The compound according to claim 1 which is 6-($\beta$-morpholinoethyl) - pyrido[2,3-b][1,5]benzothiazepin-5-one.

9. The compound according to claim 1 which is 6-($\beta$-diethylaminoethyl) - pyrido[2,3-b]benzooxazepin - 5-one hydrochloride.

10. The compound according to claim 1 which is 6-($\beta$-dimethylaminoethyl)pyrido[2,3 - b]benzooxazepin - 5-one hydrochloride.

11. The compound according to claim 1 which is 6-($\beta$-morpholinoethyl) pyrido[2,3 - b][1,5]-benzooxazepin-5-one hydrochloride.

References Cited

UNITED STATES PATENTS

| | | | |
|---|---|---|---|
| 2,852,510 | 9/1958 | Hoffmann et al. | 260—239.3 |
| 3,150,125 | 9/1964 | Schmutz et al. | 260—239.3 |
| 3,316,249 | 4/1957 | Hanze | 260—239.3 |
| 3,316,251 | 4/1967 | Schmidt | 260—239.3 |
| 3,326,900 | 6/1967 | Schmidt | 260—239.3 |
| 3,337,536 | 8/1967 | Schmutz et al. | 260—239.3 |
| 3,376,289 | 4/1968 | Schmidt et al. | 260—239.3 |

OTHER REFERENCES

Burger "Medicinal Chemistry," 2nd ed., pp. 72–81, (Interscience) (1960).

HENRY R. JILES, *Primary Examiner*.

R. T. BOND, *Assistant Examiner*.

U.S. Cl. X.R.

424—244, 266